United States Patent
Malke et al.

(10) Patent No.: US 10,543,670 B2
(45) Date of Patent: Jan. 28, 2020

(54) SEPARATING FILM AND METHOD

(71) Applicant: Airbus Operations GmbH, Hamburg (DE)

(72) Inventors: Christian Malke, Hamburg (DE); Rainer Schildt, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 777 days.

(21) Appl. No.: 14/555,620

(22) Filed: Nov. 27, 2014

(65) Prior Publication Data
US 2015/0174878 A1    Jun. 25, 2015

(30) Foreign Application Priority Data
Dec. 19, 2013 (DE) .................. 10 2013 114 574

(51) Int. Cl.
*B32B 37/12* (2006.01)
*B32B 5/02* (2006.01)
(Continued)

(52) U.S. Cl.
CPC .......... *B32B 37/1284* (2013.01); *B32B 5/024* (2013.01); *B32B 5/026* (2013.01);
(Continued)

(58) Field of Classification Search
CPC ........ B32B 15/02; B32B 15/08; B32B 27/08; B32B 27/1284; B32B 5/024; B32B 5/026; B32B 2605/18; B32B 2262/106; B32B 2307/202; B32B 27/322; B32B 27/304; B32B 2556/00; B32B 2307/31; B29C 65/562; B29C 66/54; B29C 66/0042;
(Continued)

(56) References Cited

U.S. PATENT DOCUMENTS 4,923,741 A * 5/1990 Kosmo ............ A41D 31/0027
428/328
5,475,203 A * 12/1995 McGaffigan .......... B29C 65/344
219/545

(Continued)

FOREIGN PATENT DOCUMENTS

DE     102010044116     4/2011
EP         2318150     5/2011
WO   WO-2014033440 A1 *  3/2014  .......... B29C 66/524

OTHER PUBLICATIONS

German Search Report, dated Dec. 19, 2013.

*Primary Examiner* — Elizabeth C Imani
(74) *Attorney, Agent, or Firm* — Greer, Burns & Crain, Ltd.

(57) ABSTRACT

A separating film with an anti-adhesion layer for preventing an adhesive connection between a thermally curable levelling compound, applied in the region of a joining zone of a first component, and a joining zone of a second component to be joined to the first component. The anti-adhesion layer is provided, at least in parts, with a heating layer. As a result of the actively electrically heatable heating layer of the separating film, which is an integral part of the separating film, the processing time for joining two components, which are subject to tolerances, using a thermally curable levelling compound (known as liquid shimming), can be reduced by at least 40% compared with the conventional process.

8 Claims, 2 Drawing Sheets

(51) Int. Cl.
*B32B 27/30* (2006.01)
*B32B 37/24* (2006.01)
*B32B 38/10* (2006.01)

(52) U.S. Cl.
CPC .............. *B32B 27/30* (2013.01); *B32B 37/24* (2013.01); *B32B 38/10* (2013.01); *B32B 2037/243* (2013.01); *B32B 2250/02* (2013.01); *B32B 2605/18* (2013.01); *Y10T 156/10* (2015.01); *Y10T 428/31544* (2015.04); *Y10T 442/3976* (2015.04); *Y10T 442/40* (2015.04)

(58) Field of Classification Search
CPC .......... B29C 66/12821; B29C 66/1284; B29C 66/131; B29C 66/53; B29C 66/02; B05D 5/08; B05D 5/083; Y10T 156/10; Y10T 442/3976; Y10T 428/31544; F16L 55/18
USPC ....................... 442/229, 15, 377, 397; 138/99
See application file for complete search history.

(56) References Cited

U.S. PATENT DOCUMENTS

| | | | | |
|---|---|---|---|---|
| 5,826,503 A | * | 10/1998 | Hutchinson | B29C 65/18 |
| | | | | 100/320 |
| 5,968,639 A | | 10/1999 | Childress | |
| 2004/0188419 A1 | * | 9/2004 | Fukuda | H05B 3/34 |
| | | | | 219/549 |
| 2010/0213189 A1 | * | 8/2010 | Keite-Telgenbuescher | |
| | | | | B60R 1/0602 |
| | | | | 219/548 |
| 2013/0061970 A1 | * | 3/2013 | Green | F16L 55/18 |
| | | | | 138/99 |

\* cited by examiner

SEPARATING FILM AND METHOD

CROSS-REFERENCES TO RELATED APPLICATIONS

This application claims the benefit of the German patent application No. 10 2013 114 574.4 filed on Dec. 19, 2013, the entire disclosures of which are incorporated herein by way of reference.

BACKGROUND OF THE INVENTION

The invention initially relates to a separating film with an anti-adhesion layer for preventing an adhesive connection between a thermally curable levelling compound applied in the region of a joining zone of a first component and a joining zone of a second component to be joined to the first component. The subject matter of the invention is also a method of joining two components that are subject to tolerances.

Components made of fiber-reinforced plastics, e.g., carbon fiber-reinforced plastic ("CFRP"), glass fiber-reinforced plastics (GFP), plastics reinforced with Aramid® fibers or suchlike, generally exhibit unavoidable manufacturing-related tolerances which can arise, for example through incalculable dimension changes during the hardening process of the components. For this reason, before joining such components, tolerance compensation measures have to be taken. If, without prior reduction in the gap dimension in the joining zone the components are joined with a still admissible stress, an unforeseeable reduction in the service life can occur, which is not tolerable in aviation applications. In carbon fiber-reinforced plastic components, this reduction in service life is mainly brought about through delamination as a result of internal mechanical stresses, and in metal components through stress crack formation, stress corrosion and/or fatigue.

The tolerance compensation urgently required for stress-free assembly can take place, for example, through the provision of solid supplements or the inclusion of an initially fluid, but hardenable levelling compound in the joining zone between the components to be joined (known as "liquid shimming").

As in aviation applications (structural) adhesive connections between load-bearing components of the aircraft are not permitted, adhesion of the components to the levelling compound must be reliably prevented. For this purpose a separating film is applied to at least one joining zone of a component. Separating films usually have an anti-adhesion layer of polytetrafluoroethylene (PTFE such as "Teflon®") which on one side is laminated with a glass fiber web for reinforcement. In turn, the glass fiber web can be provided with an adhesive layer, which is then in turn coated with a detachable base film for optimizing handling. In adhesive terms, through the separating film the joining zone is reliably isolated from the levelling compound so that no appreciable adhesion occurs and the components can be easily separated from other again after completion of the curing process of the levelling compound.

Through increasing the ambient temperature, placing the components in an oven, an autoclave or the use of intra-red radiators, heating mats or microwave radiators the levelling compound's curing process can be accelerated. However, due to the indirect effect of these heat sources, such procedures require a disproportionate use of energy and bring about an unwarrantable increase in the manufacturing cost as a result of the need for additional production equipment, e.g., stands, holders, clamping devices or frames.

SUMMARY OF THE INVENTION

An aim of the invention is therefore to minimize, as effectively as possible, the joining times of components subject to tolerances which are to be joined using a curable levelling compound to reduce the gap dimension.

As the anti-adhesion layer is provided at least in sections with a heating layer, the levelling compound used for tolerance compensation between the components can be hardened more quickly, through which as a result of the local heating effect, the manufacturing throughput time can be considerably reduced with a simultaneous reduction in energy utilization. The components to be joined using the separating film in accordance with the invention are preferably components made of carbon fiber-reinforced plastics and/or metallic materials, such as aluminum, aluminum alloys, titanium or titanium alloys, for example. Preferably used as the hardenable plastic mass, are thermally curable duroplastic plastics, such as Henkel® EA9394 and Hexcel® Redux 870, the physical properties of which are comparable to those of conventional epoxide resin-based dual-component adhesives.

An advantageous further development of the separating film envisages that the heating layer is at least partially provided with an adhesive layer on the underside facing away from the anti-adhesion layer. This ensures particularly reliable position fixation of the separating film on the first component so that on fitting the components together they do not change their position. The adhesive layer can be formed with any sufficiently adhesive, film-like layer. In addition, the adhesive layer can also be produced with an "adhesive nano-coating" for example.

A further beneficial embodiment of the separating film envisages that the adhesive layer is provided, at least in sections, with a detachable base layer. As a result of the base layer, the handling of the separating film is facilitated as unwanted adhesion thereof to other components and outside the joining zone is prevented. Furthermore, the tensile strength of the separating film is increased in order to avoid it tearing during use as far as possible.

In the case of one beneficial further development it is envisaged that the heating layer is formed with thin strands, more particularly wires, and/or with thin-layer surface structures made of an electrically conductive material. As result of this the heating layer constitutes an ohmic resistance. The heat dissipated as the current flows through brings about a defined increase in temperature/warming of the heating layer. In connection with this description, the term "strand" denotes an elongated, essentially cylindrical linear, wire-like object with a diameter of less than 50 μm. The strands/wires can be formed of any metallic material and/or with polymer materials and/or with conductive oxides. The same applies to the surface structures.

In an advantageous embodiment, the strands more particularly form a web, a mat, a weave or a knit. Through this a sheet resistance with a defined ohmic impedance can be brought about which permits an even heat output over its upper surface and thereby an optimally accelerated curing of the levelling compound.

In another favorable further development of the separating film the strands and/or surface structures are formed with copper, aluminum, carbon, conductive plastic and/or with conductive oxides. Through this, the physical properties of the heating layer can be easily adapted to the different requirements of the levelling compound, e.g., a maximum permissible hardening temperature. In addition, the production process of the electrically heatable separating film can be optimized through suitable material selection.

Preferably the heating layer comprises at least two electrically conductive contact zones for electrical connection to a power supply. In this way simple electrical connection of the heating layer to an external power source is brought about. For example, clips known from metrology, e.g., crocodile clips or suchlike can be used for reliable electrical connection to the contact zones. To even out the heat release, more than two contact zones can be envisaged in the cases of large-area separating films.

Preferably the heating layer can be heated by way of the electrical power supply in order to accelerate the hardening of the levelling compound. Through this the process times required for gap reduction when joining components of carbon fiber-reinforced plastic that are subject to tolerances can shortened by at least 40% in comparison with conventional curing of the levelling compound. Additionally, the power supply can be such that the strength of the current flowing through the heatable separating film is time-variable in order, for example, to generate special temperature curves for further optimization of the hardening process. With this, in addition to the determination of the ohmic resistance of the heating layer during the production of the separating layer that takes place through material selection and geometry, another subsequently modifiable parameter is available for influencing the thermal properties of the heatable separating film.

Preferably the anti-adhesion layer is formed of polytetrafluoroethylene and/or another anti-adhesive plastic. Through this, adhesion of the levelling compound to the separating film is largely prevented. Furthermore, a heating layer built up with a copper wire web, for example, can be easily clad with a PTFE film to create the anti-adhesion layer.

Preferably the material thickness of the separating film is between 100 µm and 300 µm. Due to its comparatively small material thickness, the separating film has no appreciable influence on fitting between the components and, can be removed without problem before the definitive joint process without impairing the achieved fit.

The object in accordance with the invention is also achieved by a method comprising the following steps:

Application of a levelling compound in the region of a joining zone of the first component for reducing the gap between components that are subject to tolerances, Application of a heatable separating film, more particularly the electrically heatable separating film with an anti-adhesion layer, for preventing an adhesive connection between a thermally curable levelling compound applied in the region of a joining zone of a first component and a joining zone of a second component to be joined to the first component, wherein the anti-adhesion layer is provided, at least in sections, with a heating layer, optionally, wherein on an underside facing away from the anti-adhesion layer, the heating layer is provided, at least in sections, with an adhesive layer, optionally, wherein the adhesive layer is, at least in sections, provided with a detachable base layer, optionally, wherein the heating layer is formed with at least one of thin strands and thin-layer surface structures of an electrically conductive material, optionally, wherein the strands form one of a web, a mat, a weave and a knit, optionally, wherein at least one of the strands and the surface structures are formed with at least one of copper, aluminum, carbon, conductive plastic and conductive oxides, optionally, wherein the heating layer has at least two electrically conductive contact zones for electrical connection to a power supply, optionally, wherein through energizing by the electrical power supply, the heating layer is heatable for accelerated curing of the levelling compound, optionally, wherein the anti-adhesion layer is formed with one of polytetrafluoroethylene and another anti-adhesive plastic, optionally, wherein material thickness of the separating film is between 100 µm and 300 µm, in the region of a joining zone the second component, Bringing of the components into an intended joining position and Accelerated heating of the levelling compound by way of the heatable separating film.

Through the method according to the invention, using the electrically heatable separating film, a significant shortening of the processing time is possible, in particular when joining carbon fiber-reinforced plastics that are subject to tolerances.

An advantageous embodiment of the method envisages that the separating film is removed and the components are definitively joined with at least on connection means. This results in a definitive, durable and mechanically high-strength connection of the components, which may in particular be used for load-bearing structural joints in aircraft manufacturing. After the preferably complete and residue-free removal of the separating film, subsequent optional processing stages can take place e.g., grinding, polishing, drilling, cleaning and alignment processes.

BRIEF DESCRIPTION OF THE DRAWINGS

In the drawing the same design elements each have the same reference number.

DETAILED DESCRIPTION OF THE PREFERRED EMBODIMENTS

Figure 1:
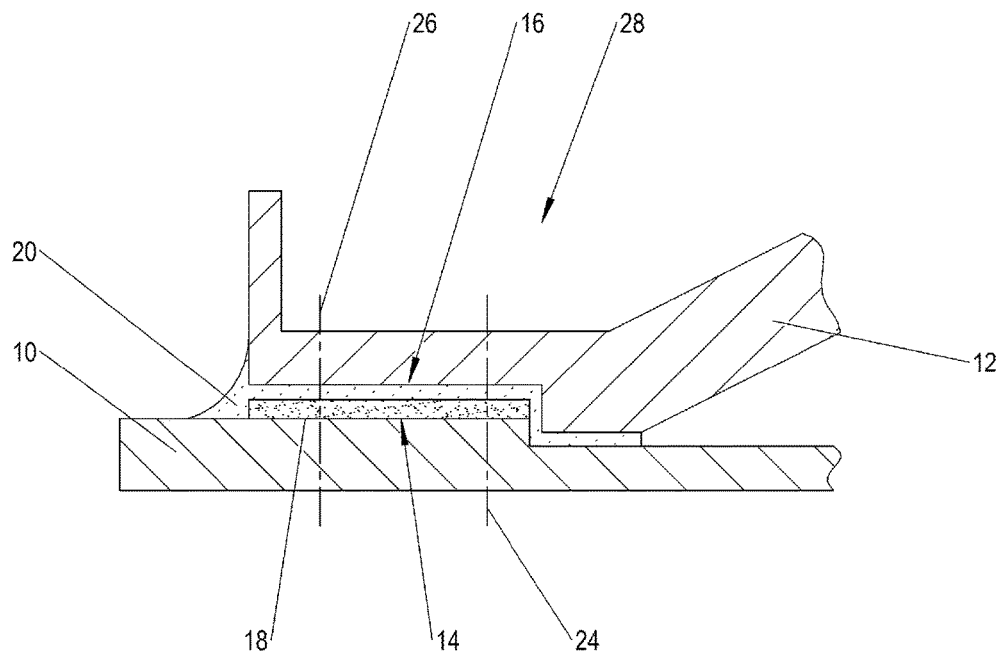
FIG. 1 shows a schematic cross-section of pressure-tight joint between two components using a curable levelling compound for tolerance compensation.

FIG. 1 shows a schematic cross-section of pressure-tight joint between two components using a curable levelling compound for tolerance compensation as is widely found in aircraft manufacturing.

A first component 10 and a second component 12 each have a joining zone 14, 16, which face each other and run in parallel at a distance from one another. The necessary vertical tolerance compensation between the two components 10, 12 takes place, here only as an example, through a curable levelling compound 18 applied in the region of the joining zone 14 of the first component 10. Alternatively, the curable levelling compound 18 can also be applied in the region of the joining zone 16 of the second component 12. Optional pressure-tight sealing between the components 10, 12 takes place by means of a preferably permanently elastically hardening sealing mass 20. The components 10, 12 thus positioned with regard to each other are completed with structural connection means 24, 26 such as, for example, bolts, rivets or clips to form a mechanically high-strength durable structural joint 28.

The components 10, 12 can be made with carbon fiber-reinforced materials, such as, for example, aluminum, titanium or suchlike. The levelling compound 18 is preferably a thermally curable duroplastic plastic or a dual component adhesive such as Henkel® EA9394 or Hexcel® Redux 870. Initially the levelling compound has a fluid to thick viscous consistency and then becomes solid after the curing process. Permanently elastically hardening dual component-based polyurethanes can be used as the sealing mass for example.

Figure 2:
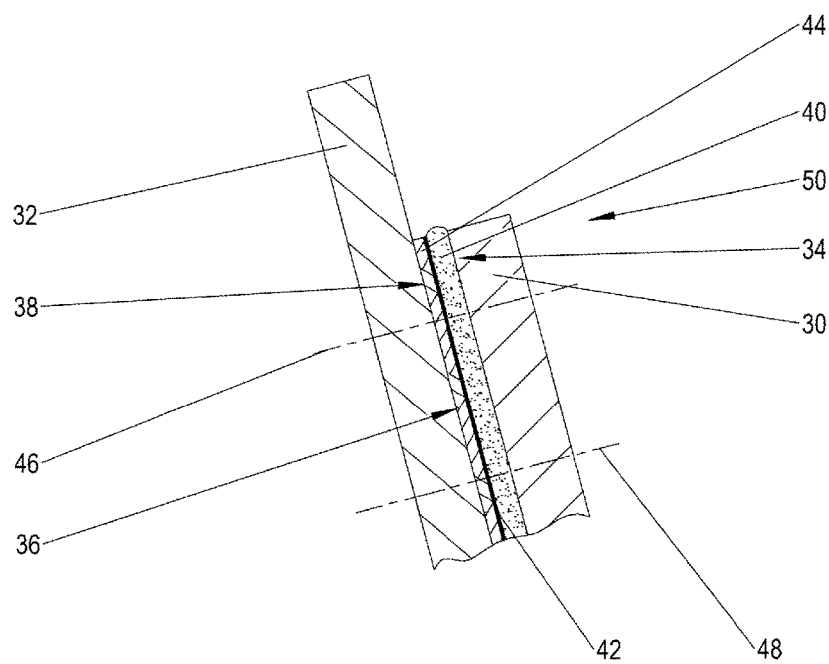
FIG. 2 shows a schematic cross-section of two components joint using a levelling compound and separating film in accordance with the invention.

FIG. 2 shows a schematic cross-section of two components joined using a levelling compound and the separating layer in accordance with the invention.

Two components 30, 32 to be joined each have a joining zone 34, 36, again running in parallel to each other and facing one another. Applied in the region of the joining zone 36 of the second component 32 is an electrically-heatable separating film 38 in accordance with the invention. The required tolerance compensation between both components 30, 32 takes place by means of a thermally curable levelling compound 40, wherein through the separating film 38 unwanted adhesion of the components 30, 32 is reliably prevented. In order to achieve this, the separating layer 38 has—here simply shown in the drawing with an increased line width—a thin anti-adhesion layer 42 made of an anti-adhesive plastic, such as, for example, polytetrafluoroethylene (PTFE such as Teflon®).

By applying power to a sufficiently electrically conductive heating layer 44 of the separating film 38 by way of a power source, which is also not shown here, it is heated through the ohmic heat loss as a result of which the curing process of the levelling compound 40 is considerably accelerated or shortened by at least 40% compared with conventional curing at room temperature. Accordingly the joining times of CFRP components are considerably reduced.

The heating layer 44 which essential constitutes a purely ohmic sheet resistance, can be formed of any spatial arrangement of electrically conductive elements, such as strand-like objects, more particularly wires, thin films, film strips or hole matrix films. Also conceivable are longitudinally or transversely expanded slit films and/or perforated metallized films of small material thickness. The conductive elements of the heating layer 44 can be built up with, for example, copper, aluminum, tin, carbon fibers, conductive plastics and/or thin conductive oxides, in combination and each contacting each other to form a integrally acting ohmic sheet resistance. In some circumstances suitable position fixation of the electrical elements is necessary after achieving full contacting. This can take place, by means of a spray adhesive or another adhesive agent for example. The heating layer can comprise a wire laid in a meandering fashion, a wire web, a wire mat, a wire weave or a wire knit of the aforementioned materials and/or in combination with conductive surface structures. The heating layer 44 can be mounted, laminated onto the anti-adhesion layer 42 or at least partially fused therewith.

By way of two connection means 46, 48, the two aligned components 30, 32 are connected to form a mechanically high-strength, durable joint 50. Preferably, the separating film 38 is removed completely before final joining of the components 30, 32. Optionally a sealing mass, which is not shown here, can be provided to achieve a hermetically pressure-tight joint 50 between the components 30, 32.

Figure 3:
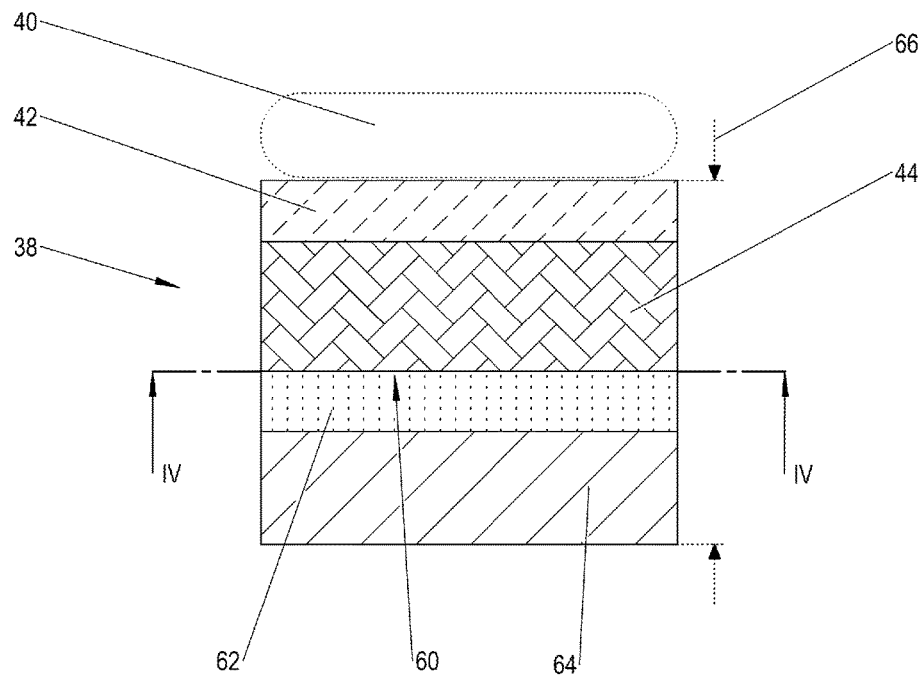
FIG. 3 shows a cross-section of the electrically heatable separating film in FIG. 2.

FIG. 3 illustrates a cross-section of the electrically heatable separating film from FIG. 2.

The separating film 38 comprises the heating layer 44, which is provided on one side with the anti-adhesion layer 42. The anti-adhesion layer 42 forms the interface with the levelling compound 40, which is simply shown by a broken line. Provided here by way of example, on an underside 60 of the heating layer 44 facing away from the anti-adhesion layer 42 is an optional adhesive layer 62 which is also provided with an, also optional, removable base layer 64 or a cover layer. The adhesive layer 62 facilitates the fixing in place of the separating film 38 on the component to be protected, while the base layer 64 above simplifies the handling of the separating film 38 before it is pulled from the adhesive layer 62.

Furthermore, the adhesive layer 62 on the underside 60 can, for example, also be formed with an "adhesive nano-coating" for temporary position fixing. Such nano-coatings are widely used in vehicles and aircraft for anti-slip mats, for example. An adhesive nano-coating would also allow the film to be reused, which in comparison with conventional separating films means a considerable saving of resources and an associated reduction in material costs.

Both the adhesive layer 62 and the base layer 64 are not absolutely necessary for the primary functionality of the separating film 38 as these can be simply applied to a component. A material thickness 66 of the separating film, including adhesive layer 62 and the base layer 64 is between 100 and 300 μm, so that the separating film 38, a least in terms of weight aspects, could, if necessary, also remain between the definitively joined components.

Figure 4:
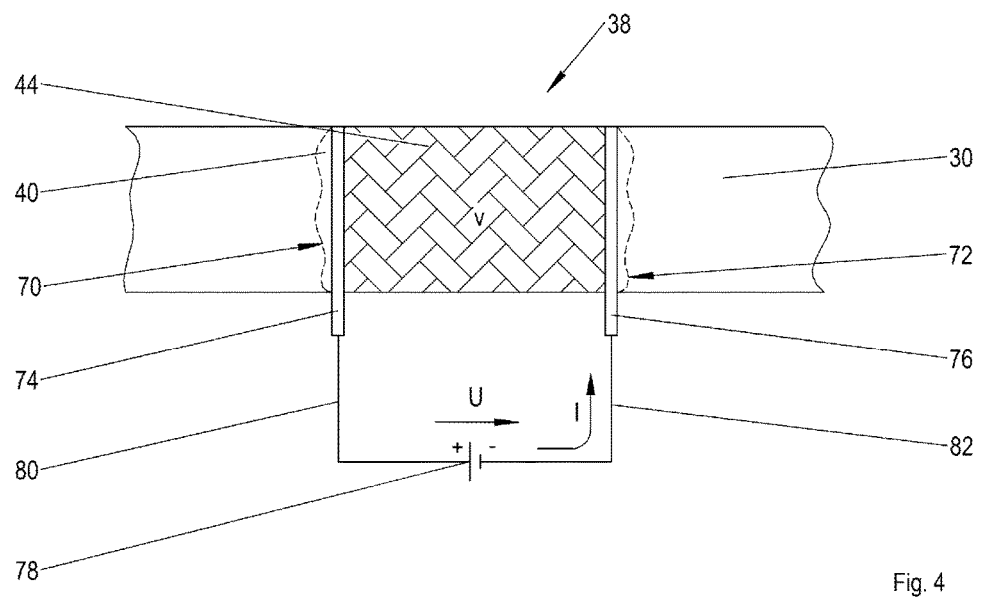
FIG. 4 shows a view from above of the separating film in accordance with line IV-IV in FIG. 3.

FIG. 4 shows a view from above of the separating film along the line IV-IV in FIG. 3.

The separating film 38 lies on the levelling compound 40 applied to the component 30 (cf. FIG. 2). Provided in the region of two transverse edges 70, 72 of the heating layer 44 of the separating film 38 there are electrically good conductive, low-ohmic rectangular contact zones 74, 76, which here, solely as an example, run transversely to a longitudinal side of the component 30. The two contact zones 74, 76 are preferably made with copper. The contact zones 74, 76 are connected, i.e., welded, to the heating layer 44 of the separating film 38 in an electrically conductive manner. The electrical connection of an external power supply 78 takes place via at least two leads 80, 82, which are connected in an electrically conductive manner with the contact zone 74, 76, by means of clips, such as crocodile clips, for instance, during the levelling compound curing process. Through the energizing of the heating layer 44 by means of the power supply 80 the heating layer 44 is heated to a temperature θ, which is considerably higher than normal room temperature, which leads to a considerable acceleration of the levelling compound curing process and hand in hand with this a considerably shortening of the entire joining process. A voltage U is present between the contact zones 74, 76 which results in a current flow I through the leads 80, 82 and the heating layer 44 including the contact zones 74, 76. By means of a current I of suitable strength, the heating layer 44 can be electrically heated to a temperature θ of up to 100° C. Preferably, for the temperature θ values between approx. 50° C. and 80° C. are set.

Below, the sequence of the method for joining two components which are subject to tolerance will be explained in more detail:

In process stage a) a suitable levelling compound is initially applied in the region of a joining zone of the first component in order to reduce the gap dimensions that are inevitable as a result of manufacturing tolerances. In doing so, it may be necessary to remove surplus levelling compound as far as possible in order to prevent uncontrolled distribution of the levelling compound through squeezing out when the components to be joined are fitted together.

Furthermore, the application of too great an amount of levelling compounds considerably impairs the gap dimension reduction as upon fitting the components together, a greater volume has to be displaced than would be necessary for reducing the gap dimension. Thereafter, in a process stage b) the electrically heatable separating film in accordance with the invention is applied in a second joining zone of the second component. In processing stage c) the two components to be joined are aligned/positioned with regard to each other until the intended joining position is achieved while simultaneously minimizing the gap dimension in the joining zone.

Finally—after reaching the definitive joining position in processing stage c)—in processing stage d) the accelerated curing of the levelling compound takes place through energizing the heating layer of the separating film by way of the external power supply. For this purpose a voltage U is set on the external power supply which results in a current flow I sufficient for the required heat output of the heating layer 44.

Because of the use of the actively heatable separating film, the method in accordance with the invention allows for a significant shortening of the processing time in the assembly of components that are subject to tolerances, more particularly CFRP components and/or metallic components, of at least 40 percent in comparison with conventional joining processes involving gap dimension reduction.

After completed curing of the levelling compound in process stage d), the separating film is generally removed in its entirety. Finally, the two components can be definitively joined to each other by way of suitable connection means, such as, for example, bolts, rivets or clips.

Prior to this, further processing stages, such as grinding, deburring, polishing and cleaning of levelling compound and joining areas not covered by it can be carried out. If necessary, any still surplus levelling compound is removed from the joining zone between the components and the fit achieved through the levelling compound is checked with the compounds aligned correctly with regard to each other.

Moreover, before applying the drilled holes which may be required for the used fastening means, the components to be joined must generally be precisely positioned/aligned with regard to each other.

In addition, the electrically heatable separating film can also be advantageously used outside the joining process of CFRP component in connection with a large number of other application scenarios, such as, for example, laminating processes of CFRP components, adhesion processes of CFRP components, as well as the manufacturing of CFRP components by means of the known Tailored Fiber Placement Process ("TFP process".)

The invention relates to a separating film with an antiadhesion layer for preventing an adhesive connection between a thermally curable levelling compound, applied in the region of a joining zone of a first component, and a joining zone of a second component to be joined to the first component. In accordance with the invention, the antiadhesion layer is provided, at least in parts, with a heating layer. As a result of the actively electrically heatable heating layer of the separating film, which is an integral part of the separating film, the processing time for joining two components which are subject to tolerances using a thermally curable levelling compound (known as liquid shimming) can be reduced by at least 40% compared with the conventional process.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE NUMBERS

10. first component
12. second component
14. joining zone (first component)
16. joining zone (second component)
18. levelling compound
20. sealing mass
24. connection means
26. connection means
30. first component
32. second component
34. joining zone (first component)
36. joining zone (second component)
38. separating film
40. levelling compound (shim)
42. anti-adhesion layer (separating film)
44. heating layer (separating film)
46. connection means
48. connection means
50. joint (components)
60. underside (heating layer)
62. adhesive layer
64. base layer
66. material thickness (separating film)
70. transverse edge
72. transverse edge
74. contact zone
76. contact zone
78. power supply
80. lead
82. lead

The invention claimed is:

1. A shimming system, comprising:
a separating film with an anti-adhesion layer;
a thermally curable levelling compound;
a first component with a first joining zone; and
a second component with a second joining zone;
wherein the separating film with the anti-adhesion layer and the thermally curable levelling compound are arranged between the first component and the second component, and
wherein the anti-adhesion layer is provided, at least in sections, with a heating layer, so as to prevent an adhesive connection between the thermally curable levelling compound applied in the region of the joining zone of the first component and the joining zone of the second component to be joined to the first component,
wherein the anti-adhesion layer is attached to the heating layer and arranged between the heating layer and the thermally curable levelling compound, such that when thermal energy flows through the anti-adhesion layer, an adhesive connection between the thermally curable levelling compound and the heating layer is prevented,
wherein, through the separating film, the joining zone of the first component and the joining zone of the second component are reliably isolated from the levelling compound so that no appreciable adhesion occurs and the first and second components can be easily separated from other again after completion of the curing process of the levelling compound.

2. The shimming system according to claim 1, wherein the heating layer is formed with at least one of thin strands and thin-layer surface structures of an electrically conductive material.

3. The shimming system according to claim 2, wherein the strands form one of a web, a mat, a weave and a knit.

4. The shimming system according to claim 2, wherein at least one of the strands and the surface structures are formed with at least one of copper, aluminum, carbon, conductive plastic and conductive oxides.

5. The shimming system according to claim 1, wherein the heating layer has at least two electrically conductive contact zones for electrical connection to a power supply.

6. The shimming system according to claim 5, wherein through energizing by the electrical power supply, the heating layer is heatable for accelerated curing of the levelling compound.

7. The shimming system according to claim 1, wherein the anti-adhesion layer is formed with one of polytetrafluoroethylene and another anti-adhesive plastic.

8. The shimming system according to claim 1, wherein material thickness of the separating film is between 100 μm and 300 μm.

* * * * *